Sept. 25, 1962 TOSHIO CHYO 3,055,444
WEIGHING BALANCE

Filed Jan. 19, 1959 3 Sheets-Sheet 1

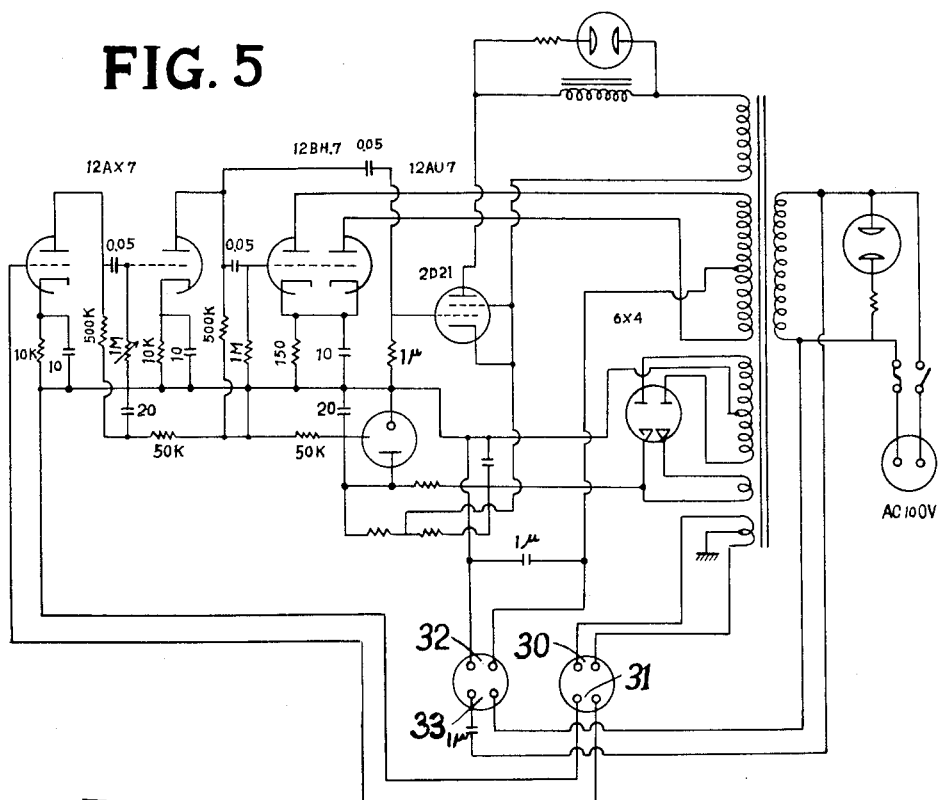
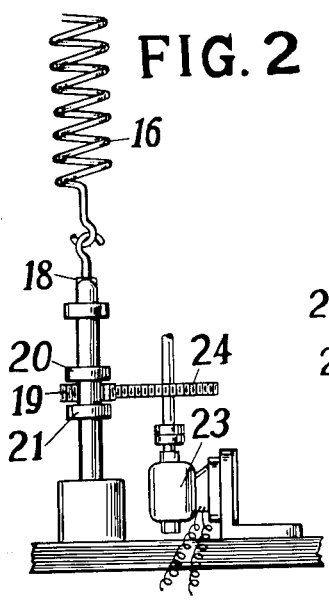
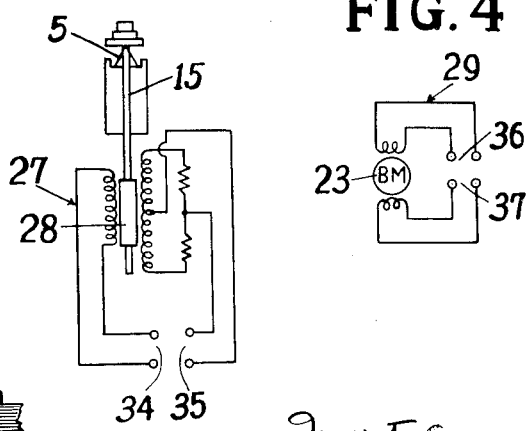
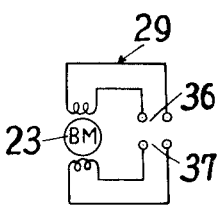

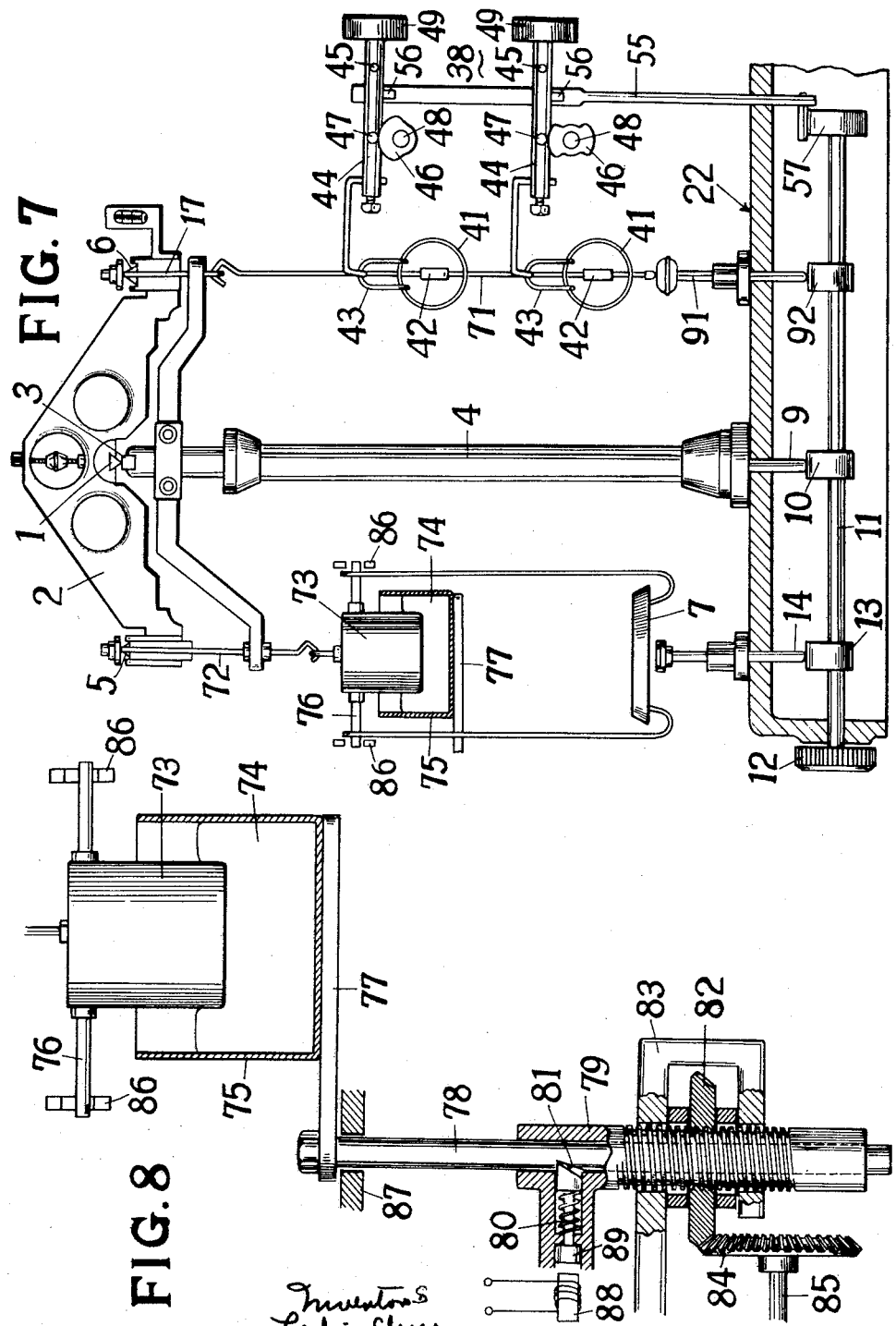

United States Patent Office 3,055,444
Patented Sept. 25, 1962

3,055,444
WEIGHING BALANCE
Toshio Chyo, 262 Kashiracho, Kamichojamachi-Agaru, Nishinotoin-Dori, Kamigyoku, Kyoto, Japan
Filed Jan. 19, 1959, Ser. No. 787,452
Claims priority, application Japan Jan. 21, 1958
3 Claims. (Cl. 177—191)

This invention relates to a weighing balance, and especially to an improvement in an automatic balance in which counter-weights, nearly equal to the weight of the sample deposited, are automatically added or removed.

It is known that, among apparatuses for weighing, both precision and accuracy are best in the weighing balance which usually comprises a balance beam and two scales for depositing a sample and counter-weights respectively. In the existing kind of balances, however, there is needed a large number of additions and removals of counter-weights before the balance beam arrives at a state of perfect balance. Thus, since the weighing operation proceeds stepwise for each counter-weight, this necessitates an appreciable amount of time for the measuring operation, and causes damage and wear of the knife edge at the fulcrum of the beam.

On the other hand, in an automatic weighing apparatus utilizing a continuously varying balance load, such as a spring balance in which the sample weight is balanced by the tension of a spring, the sample's weight can be automatically and instantly measured in accordance with Hook's Law. However, in the spring balance there is an unavoidable and serious disadvantage in that both precision and accuracy are not as good as in the ordinary balances having a balance beam and two scales.

This invention therefore has among its objects to provide a new balance in which the measuring operation can be accomplished extremely quickly with the least wear and damage in the knife edge of the beam, and wherein the measure of precision and accuracy is as high as in the ordinary balances.

The above object is attained by providing means for roughly measuring the weight of the sample by counter-balancing the sample weight load with a continuously variable load, and means for substituting a counter-weight load for said continuously variable load.

According to this invention, the weight of the sample can be instantly roughly pre-measured because the counter-balancing load varies continuously, not stepwise. In this invention, the rough measurement of the sample weight is intended for pre-determining the amount of counter-weights to be deposited in case of the equi-arm balance or removed in case of the load constant balance. As the continuously variable load, a tension spring may be used by way of example.

According to this invention, after the above rough measurement of the sample weight, the preliminarily counter-balancing load, namely, the continuously variable load, is replaced by the predetermined amount of counter-weight described above. This substitution of load enables the sample weight to be measured more precisely and accurately by operating the apparatus according to the same conventional manner as that in the existing kind of beam balances.

Likewise, this invention presents a new type of automatic balance, in which counter-weights equal to that of the sample are automatically deposited on or removed from the scale. The automatic balance according to this invention has a great advantage that the time required for the balance beam to stabilize is so short that the knife edge of the beam can be greatly protected from wear and damage.

Other objects of this invention will appear from the following specification and the novel features will be particularly pointed out in the claims at the end thereof.

Some weighing balances according to this invention are illustrated by way of example in the accompanying drawings, in which:

FIGURE 2 is a side view of the apparatus for increasing the continuously variable load, which is used in the balance illustrated in FIGURE 1;

FIGURE 3 is a partly schematic diagram showing a differential transformer as a part of servomechanism which is used in the balance illustrated in FIGURE 1;

FIGURE 4 is a diagram showing a balancing motor which is the drive power source for load increasing mechanism shown in FIGURE 2 and which is automatically controlled by servomechanism shown in FIGURES 3 and 5;

FIGURE 5 is a diagram of the amplifying apparatus as a part of servomechanism which is adapted to use in the balance illustrated in FIGURE 1;

FIGURE 7 is a front view, partly cut off, of another weighing balance according to this invention; and FIGURE 8 shows, on an enlarged scale, partly in section, an apparatus for increasing the preliminary counter-balancing load which is used in the balance illustrated in FIGURE 7.

Figure 1:
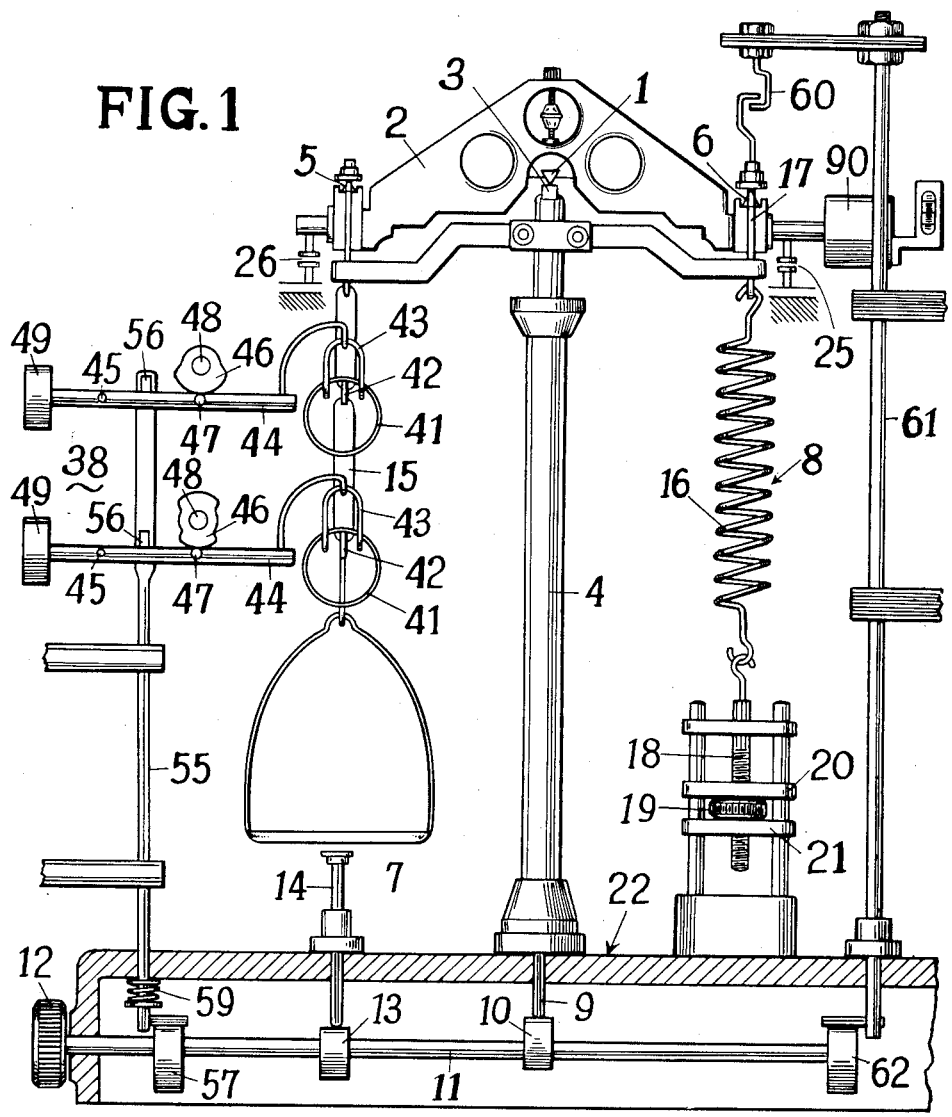
FIGURE 1 is a front view, partly in section of a weighing balance according to this invention.

Referring to FIGURE 1 of the drawings, the knife edge 1 as a fulcrum at the center of the balance beam 2 is supported on a surface 3 on the top of the standard 4. Two knife edges 5, 6 at the ends of the beam 2 support respectively a pan 7 for depositing the sample and a continuously load-increasing mechanism which is generally indicated as 8. These three knife edges 3, 5, 6 come in contact with, or disengage their respective receiving members simultaneously by vertically shifting an arresting shaft 9 which passes through the standard 4, in the same manner as the conventional balances. 10 is a cam plate for giving the arresting shaft 9 vertical movement; 11 is a handle shaft for turning the cam plate 10; and 12 is a knob of the handle shaft 11. The handle shaft 11 is also provided with another cam plate 13 which engages with an arrestor 14 so that the upward movement of the arrestor 14, when the cam 13 is turned, enables the sample pan 7 to be supported. 15 is the suspender of the pan 7.

The continuously load-increasing mechanism 8 comprises, for example, a coil spring 16, the upper end of which is hooked to a suspender 17 being hung from the knife edge 6 of the beam 2, and the lower end of which is connected to a tensile bar 18. The tensile bar 18 is adapted by threading for travel through a gear 19 at its center and is vertically movable when the gear 19 turns. Gear 19 is stationed between two plates 20, 21 which are firmly fixed on the instrument base 22 so as not to move vertically, permitting its rotation. The vertical movement of the bar 18 increases or decreases the tension in the spring 16 on the knife edge 6.

After any sample is deposited on the pan 7, when the beam 2 is released from rest so as to swing freely and each knife edge 3, 5, 6 is deposited on its own receiving member according to the conventional manner, the beam 2 dips at its sample side, because of the weight of the sample on the pan 7. The spring 16 is thus stretched. However rod 18 is travelled downward by rotation of gear 19 in order to gradually and continuously pull on spring 16 and increase the load put on the knife edge 6 at the right end of the beam 2 until the beam 2 regains balance.

The operation of increasing the load on the knife edge 6 may be carried out either by hand or by mechanical power; as by using an electric motor. FIGURE 2 shows an example in which this loading is effected by the drive of a motor. In FIGURE 2, the numeral 23 indicates the motor for driving the gear 19 through a gear 24. In this way the spring 16 is pulled downward by the rod 18 to gradually increase the load on the knife edge 6. The motor 23 should be switched on after or at the same time that the beam 2 is released from resting. Likewise, motor 23 should be de-actuated as soon as the beam 2 regains balance.

In the above operation it is desired that the motor 23 is automatically controlled so as to stop its rotation as soon as the beam 2 arrives at a state of balance. The effect of the automatic control of the above-mentioned loading operation may be obtained in one of the simplest embodiments by providing the electric circuit containing the motor 23 with a switch which is normally open when the beam 2 is in the state of balance, but closed when the beam is tipped. 25 in FIGURE 1 is a switch for this purpose, which is attached to the beam 2 near the right side knife edge 6. If desired one more switch 26 may be attached to the other side of the beam 2 as shown in FIGURE 1; the reversible control of the loading thus being easily possible.

It is also possible to use servomechanism such as a differential transformer. FIGURES 3 to 5 illustrate an example of an automatic control, adopting a differential transformer mechanism, of the motor 23 for driving the gear 24. The numeral 27 in FIGURE 3 generally indicates a conventional differential transformer, the structure and functions of which are well known. 28 is an armature as the mobile member in the transformer 27, and which may be mounted on an end position of the beam 2 or on its attached member, for example, the pan suspender 15 as shown. Any inbalance of the beam 2 can be detected by detecting any variation of the magnetic field of the transformer 27 occurring when the armature 28 is moved together with the suspender 15, as the beam 2 moves under the weight of the sample. The variation of the magnetic field, as the detected signal, in the transformer 27 is amplified by using a proper mechanism as shown by way of example in FIGURE 5 and transmited to motor control means generally indicated as 29 in FIGURE 4. Such a motor having the automatic control means 29 is usually called "a balancing motor." In this way the motor 23 may be automatically controlled so as to stop its rotation as soon as the beam 2 takes a position of perfect balance. Means to amplify the detected signal can be easily understood from the diagram of terminals 30, 31, 32, 33 in FIGURE 5 being respectively connected to four pairs of terminals 34, 35 in FIGURE 3 and 36, 37 in FIGURE 4. Any other servomechanism which applies the principle of a negative feed-back amplifier can be used in place of the above-mentioned automatic control means.

The weight of the sample can be measured from the number of revolutions of the gear 19 which is in proportion to the increased tensile load. The result of this rough measurement would not, however, be as precise and accurate as in the ordinary balance weighing.

The above described is the first step of weighing operations according to this invention, in which the sample is roughly weighed by counter-balancing its weight load with the continuously variable load. This primary measuring provides only a preparatory stage prior to the secondary precision measuring and therefore the result of said rough measurement is not necessarily indicated for reading. It does however enable the apparatus to determine the rough amount of counter-weights to be deposited in equi-arm balances or removed in load constant balances.

Secondly, a weighting balance according to this invention is provided with means for substituting the counterweight load on the scale for the above-mentioned preliminary counter-balancing load. The substitution of said two loads may be made, either by hand or by mechanical power. The following descriptions disclose an automatic load-substituting method by way of example.

The balance which is shown in FIGURE 1 is provided with a balance weight 90 at one end of the beam 2, and counterweight depositing means 38 and a sample pan 7 at the other end of the beam 2. The counter-weight depositing means 38 and the sample pan 7 are hung on the same point of the beam 2, namely on the knife edge 5 at the left end of the beam 2. In this type of balance, all weighing is made under constant load and counterweights are removed, not added, as required by the sample on the pan 7. Thus the load on the beam is always brought to a fixed weight and this is accomplished by removing weights equal to that of the sample. This type of balance is already shown in German Patent No. 7,147 or Japanese Patent No. 182,392.

As for the apparatus for adding and removing counterweights, any of well-known mechanisms may be used. FIGURES 1 and 5 illustrate means for adding and removing counter-weights by way of example, which are also of known construction.

Figure 6:
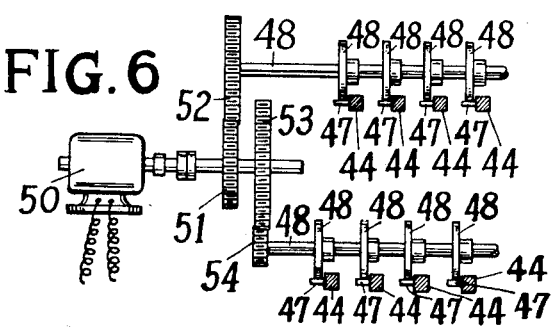
FIGURE 6 is a side view of the apparatus for adding and removing counter-weights which is used in the balance illustrated in FIGURE 1.

The counter-weights are shown in FIGURE 1 as ring weights 41 which are removable from their respective weight rods 42 with which the pan suspender 15 is provided. Each ring weight 41 is engaged by its own hook 43 attached to a manipulating lever 44. The manipulating lever 44 which is movable around a pivot 45 engages a plate cam 46 at a pin 47 so that movement of the cam 46 around its shaft 48 causes the manipulating lever 44 to remove the ring weight 41 from the rod 42 or to deposit it on the rod 42 again. The combination of a ring weight 41, a manipulating lever 44 and a cam 46 forms one unit of counterweight adding-and-removing means. Several such units of various weights are disposed in a single row, namely, holding a single weight rod 42, a single pivot 45 and a single cam shaft 48 jointly, as shown in FIGURES 1 and 6 so that a variety of weight combinations can be chosen by changing the turning angle of the single shaft 48 which is provided with the several cams 46 in different phases. Thus cam shaft 48 may be turned either by hand or by the drive of an electric motor 50 as shown in FIGURE 5. 51, 52, and 53, 54 are driving gears for turning the cam shafts 48, respectively.

The interlocking operation of loading mechanism 8 and counter-weight depositing mechanism 38 may be easily effectuated by gear drive, not shown, between the gear 19 and the cam shaft 48. In case of an electric motor drive as shown in FIGURES 2 and 5, it would be preferred to use a self-synchronizing mechanism such as the so-called selsyn motor between both motors 23 and 50. Thereby the deposition of counter-weights can be made in response to the continuous increase of the preliminary counter-balancing load in such a manner that the amount of weight effectively moved, as in the case of FIGURE 1, is equal to the weight roughly measured before.

In this interlocking operation, however, the rotation of the cam shafts 48 should only be operative to effect the predetermined amount of counter-weights 41 to be removed from the rod 42, in response to the stretching of spring 16. Further the actual pre-loading of the counter-weights 41 should be accomplished after or at the same time as the preliminary counter-balancing load of the spring 16 has been removed from the beam 2. The reason is that if this is not done, it is impossible to counter-balance the sample weight load with the continuously variable load as the load on the left side knife edge 5 would be disturbed by intermittent deposition of the counter-weights 41. This can be solved, for example, by all the manipulating levers 44 normally under the constraint of an arresting member indicated as 55 in FIGURE 1 so as not to prevent movement of levers 44 in response to the cams 46. In FIGURE 1, the arresting member is shown as a rod 55 which has stoppers 56 thereon which engage the respective manipulating levers 44; rod 55 being vertically movable when a plate cam 57 is turned by the handle shaft 11.

As described above, in the weighing balance according to this invention, after the counter-weights to be loaded are determined from the tension of the spring 16 which acts on the knife edge 6 of the beam 2, the tension of the spring 16 is removed from the beam 2 and the predetermined counter-weights 41 corresponding to the preliminary weight of the sample are removed from rods 42. When the beam 2 is in the free-swinging state, it is preferable that this load substitution is accomplished simultaneously. It will be understood that when the beam 2 is in a restricted state where beam 2 can only swing within the scope of one to two millimeters at the knife edge 5 or 6, such range is sufficient as a limit for detecting balance or unbalance between the sample load and the preliminary counter-balancing load. However the operation for releasing the beam 2 from such restricted state to the perfectly free state may also be made at the same time as the above-mentioned substituting operation. In the apparatus illustrated in FIGURE 1, removal of the continuously variable load can be made by pulling up the suspender 17, attached to the spring 16 from a hooking-up member 60 to detach the effect of the spring 16 from the knife edge 6. Up-and-down movement of the hooking-up member 60 for depositing or removing the suspender 17 from the knife edge 6 is obtained by vertically shifting a rod 61, fixed to the member 60, by means of a plate cam 62. The cam 62 may be mounted on the same shaft as that for the aforesaid cams 10, 13 and 57. These four cams 13, 10, 57, 62 on the single shaft 11 move respectively their followers 14, 9, 55, 61 at their own angle position when the shaft is turned, for example, the cam 13 at 30°; the cam 10 half at 60° and full at 90°; and the other two cams at 90°.

In operation, the sample in pan 7 is roughly pre-weighed by the tension induced in spring 16, this pre-weight which is a function of spring 16 in accordance with Hook's Law is transmitted by a conventional electrical interconnection between selsyn motors 23 and 50 such that motor 50 is actuated to remove weights 41 from rods 42 of the load constant balance equal to the pre-weight determined by spring 16.

The pre-load however is not removed from the balance until spring 16 has been disconnected therefrom. Therefore while motor 50 is actuated to rotate shafts 48 for removal of weights 41 in accordance with the sample pre-weight, the weights are not removed until arrestor 55 is released by cam 54 simultaneously with the disconnection of spring 16 from arm 2 by cam 62. Simultaneously with the disconnecting of spring 16, weights 41 are removed to effect a preliminary balance of the sample in pan 7.

After the counter-weight load is substituted for the preliminary counter-balancing load, namely the continuously variable load as stated before, the weighing balance according to this invention may be operated according to the same manner as that conventional in the ordinary balances, whereby the weight of the sample can be precisely measured, any necessary counterweights being added or removed to obtain a perfect balance of the beam and a dip angle of the beam at the state of balance being read as by using a projection scale.

Another embodiment of this invention is illustrated in FIGURES 7 and 8. The same reference numerals in FIGURE 7 as FIGURE 1 indicate respectively the members corresponding to the members indicated by those reference numerals in FIGURE 1. The balance which is shown in FIGURE 7 is provided with a sample pan and counter-weight depositing means at the both sides of the beam respectively. The knife edges 5 and 6 at the both ends of the beam 2 support by hanging respectively the pan 7 and a scale frame 71 for depositing counter-weights. In this type of balance, weighings are made by adding counter-weights equal to that of the sample. The counter-weight depositing means in FIGURE 7 is substantially the same as that in FIGURE 1 except that normally the counter-weights 41 are detached from the depositing bars 42 of the scale frame 71 which is suspended by a suspender 17 resting on the knife edge 6, the cams 46 and an arresting member 55 being arranged with manipulating lever 44 in a manner different from that in FIGURE 1.

The suspender 72 at the other side knife edge 5 holds a metal bob 73. The bob 73 is floated on a liquid body 74, such as mercury or other media of relatively high specific gravity, in a vessel 75 which is positioned at a certain height. The sample pan 7 hangs on an arm 76 horizontally attached to the bob 73.

When there is no load on the sample pan 7, the beam 2 is kept in a horizontal position under the balance of load at the both sides of it, and the bob 73 floating on the surface of the mercury 74 is stationary at a fixed depth according to the Archimedes' Principle. Once a sample is deposited on the pan 7, the beam 2 dips at the sample side, the bob 73 being submerged some added depth relative to weight of the sample according to the Archimedes' Principle.

According to this invention, under these circumstances as above, the balance of the beam 2 is re-established by giving negative load to the left side of the beam 2, that is, by increasing the buoyancy of the bob 73 in the mercury 74. FIGURE 8 illustrates means for increasing the buoyancy by way of example.

The mercury vessel 75 is set on a rack 77 which is supported by a vertical thrust shaft 78. The thrust shaft 78 is enclosed in its lower part by a sleeve 79 which is movable in the direction of its axis and engageable with the thrust shaft 78 by means of a spring pin 80. 81 is a ratchet on the shaft 78 for engaging with the spring pin 80. The sleeve 79 is threaded through a bevel gear 82 which is maintained at a fixed height position by a holding frame 83 fixed to the instrument base 22 so as to constrain its vertical movement, but permitting its rotation when driven by a drive bevel gear 84. 85 is the drive shaft of the gear 84.

Since the shaft 78 engages the sleeve 79 by means of a spring pin 80, when the gear 84 is driven, either by hand or by mechanical power; such as, electric motor power, in such a direction that the rotation of the gear 82 engaging with said drive gear 84 causes the sleeve 79 together with the thrust shaft 78 to move upward, the mercury vessel 75 on the rack 77 supported by the thrust shaft 78 is lifted upward, whereby the buoyant effect on the bob 73 in the mercury 74 is gradually and continuously increased until the amount of the buoyancy increase equals the weight load of the deposited sample.

In the above operation it is not necessary to provide a wide distance downward for the bob 73 from the position of equilibrium. In order to detect when the buoyancy counter-balances the sample load, it is preferable to limit this movement as much as possible. In practice the movement permitted to the bob 73 is limited to preferably one to two millimeters at its arm 76. FIGURES 7 and 8, with the numeral 86 is shown a stop member for the bob arm 76, which checks the downward movement of the arm 76. In this way, the beam 2 can return to a horizontal position, which means a state of balance, immediately after the arm 76 is lifted when the amount of buoyancy increase becomes equal to the weight of the sample. Equilibrium can, therefore, be determined either at the arm 76 or at the beam 2.

It will be understood that the weight of the sample can be measured from the number of revolutions of the drive shaft 85 which are required before the amount of buoyancy increase counter-balances the sample weight load in the above operations, though the result of measurement, whether it is indicated for reading or not, would not be so good in precision and accuracy. However, this rough measuring operation is greatly advantageous in that the amount of counter-weight to be deposited can be predetermined quickly.

The counter-weight depositing operation may be carried out in the way as described before with reference to the weighing balance illustrated in FIGURE 1. In this case the movement of the gear shaft 85 may be interlocked with the movement of the cam shafts 46 and it is also desired that actual deposit of the counter-weights should be put into effect after the preliminary counter-balance load; namely, the added buoyancy load, has been removed. The removal of the added buoyancy load may be carried out by releasing the thrust shaft 78 from the spring pin 80. 88 is an electro-magnet which, when actuated, attracts the iron piece 89 attached to the spring pin 80 opposing the spring force to release the shaft 78 and the sleeve 79. When released from the spring pin 80, the thrust shaft 78 together with the mercury vessel 75 falls by its own weight until the rack 77 with the mercury vessel 75 is stopped by a stopper 87. In this way the mercury vessel 75 can return to the original position and thereby the buoyancy increase can be instantly removed. It is also desired that the electro-magnet 88 is excited at the same time that the counter-weight depositing mechanism is released when the buoyancy increase becomes equal to the sample load, whereby the counter-weight load can be instantly substituted for the preliminary counter-balanced load.

After the counter-weight load has been substituted for the buoyancy load, precision measurement of the sample weight may be carried out according to the same manner as that conventional in the ordinary balance weighing.

In FIGURE 7, the numeral 91 is an arrestor for resting the scale member 71 and the numeral 92 is a cam plate for moving the arrestor when the shaft 11 is turned.

Furthermore, this invention may be applied either to the equi-arm balance with the buoyancy load or to the load constant balance with the spring tension load as well.

It will be easly understood from the above descriptions that the present invention has many great advantages in that the time for the weighing operation is extremely short; that the measure of precision and accuracy is very high; and that wear and damage in the knife edge of the beam can be kept to minimum.

This invention in its broader aspects is not limited to the specific combination and improvements described, but departure may be made therefrom within the scope of the accompanying claims without departing from the principles of the invention and without sacrificing its chief advantages.

I claim:

1. In a weighing balance, the combination with a balance beam, a sample pan, and means for weighing a sample in said pan by the addition and removal of counter-weights, said means comprising a continuously variable load element, means for selectively connecting said continuously varying load element with said balance beam to initially preweigh a sample in said pan, means operative in response to said continuously varying load element for loading counter-weights on said balance beam equal to the weight of said sample determined by said continuously varying load element, means for disconnecting said continuously varying load element from said balance beam as said counter-weights are loaded onto said balance beam.

2. In a weighing balance the combination with a balance beam, a sample pan counter-weights, and means for adding and removing counter-weights, holders for said counter-weights, members for controlling said holders, an arresting device for said holders, means for counterbalancing a sample placed in said pan, including a spring operatively connected to the balance beam, means for increasing the tension in said spring until the balance beam loaded with the sample is brought to a balanced position, means for detecting when the balance beam is brought to said balanced position, means for releasing said arresting device, means for actuating said holder control members to effect loading of counter-weights onto said balance beam equal to the weight of the sample determined by said spring, means interconnecting said holder actuating means and said spring tension increasing means, and means for removing said spring tension from said balance beam as said counter-weights are placed thereon.

3. The invention as defined in claim 1 wherein said means for weighing a sample in said pan by the addition and removal of counterweights includes counterweights, holders for said counterweights, members for controlling said holders, an arresting device for said holders, a floating member operatively connected to said balance beam, means for increasing the buoyancy of said floating member to balance the load of a sample placed in said pan and means for determining when the balanced beam is in balancing position.

References Cited in the file of this patent
UNITED STATES PATENTS

| | | |
|---|---|---|
| 40,906 | Catlin | Dec. 15, 1863 |
| 1,661,556 | Bryce | Mar. 6, 1928 |
| 2,614,825 | Kadlec et al. | Oct. 21, 1952 |

FOREIGN PATENTS

| | | |
|---|---|---|
| 699,886 | Great Britain | Nov. 18, 1953 |
| 1,004,822 | Germany | Mar. 21, 1957 |